April 29, 1941.  F. CARTLIDGE  2,239,778

CONVEYER

Filed Dec. 11, 1939  3 Sheets-Sheet 1

INVENTOR
Frank Cartlidge
BY
Clarence F. Poole
ATTORNEY

April 29, 1941.　　　F. CARTLIDGE　　　2,239,778
CONVEYER
Filed Dec. 11, 1939　　　3 Sheets-Sheet 2
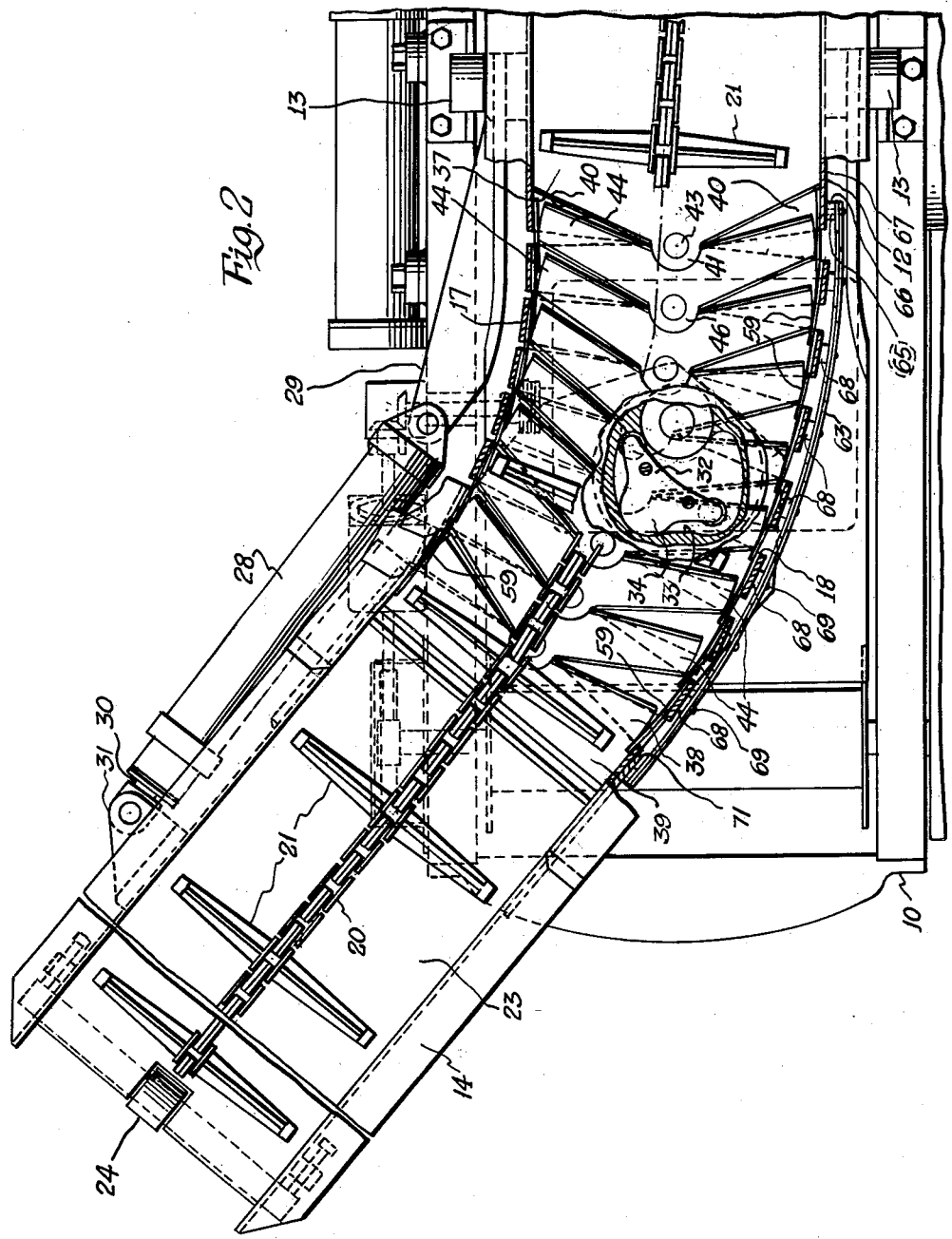
INVENTOR
Frank Cartlidge
BY
Clarence F. Poole
ATTORNEY

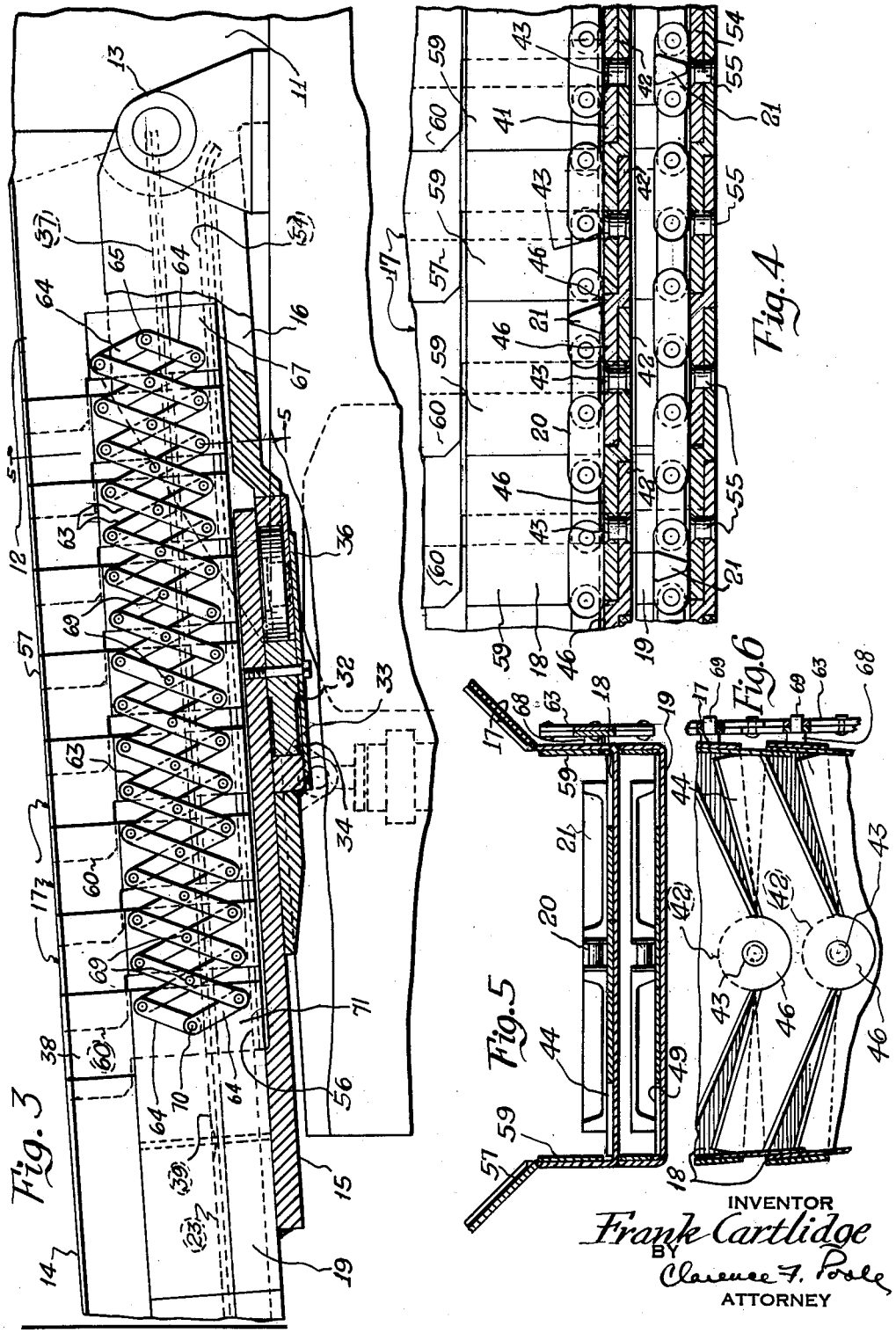

Patented Apr. 29, 1941

2,239,778

UNITED STATES PATENT OFFICE 2,239,778

CONVEYER

Frank Cartlidge, Chicago, Ill., assignor to Goodman Manufacturing Company, Chicago, Ill., a corporation of Illinois Application December 11, 1939, Serial No. 308,564

6 Claims. (Cl. 198—109)

This invention relates to improvements in conveyers, and more particularly to improvements in articulated conveyers of the center strand endless chain and flight type adapted for use with coal loading machines of the type operable at the working face of a mine.

The principal objects of my invention are to provide a new and improved articulated conveyer of a novel and simplified form and construction including a pair of spaced apart conveyer trough sections, one of which is horizontally swingable with respect to the other, and a plurality of pivotally connected trough segments for connecting said trough sections together, and arranged to form a guide for the upper and lower runs of the chain.

My present invention is somewhat similar to that shown in a prior application Serial No. 108,189, filed by me on October 29, 1936, and entitled Improvements in conveyers, and now Patent No. 2,208,269, but differs therefrom in the form and arrangement of the intermediate connecting trough segments.

Other objects of my invention will appear from time to time as the following specification proceeds and with reference to the accompanying drawings wherein:

Figure 2 is a plan view of the conveyer, with certain parts broken away and certain other parts shown in horizontal section, showing the conveyer in one extreme position of articulation;

Figure 3 is a fragmentary view in side elevation of the conveyer, with certain parts broken away and certain other parts shown in longitudinal section;

Figure 4 is an enlarged fragmentary longitudinal sectional view of an intermediate portion of the conveyer;

Figure 5 is an enlarged transverse sectional view taken substantially along line 5—5 of Figure 1; and Figure 6 is a fragmentary detail plan view of several of the trough segments of the conveyer, drawn to substantially the same scale as Figure 5 and with certain parts shown in longitudinal section.

Figure 1:
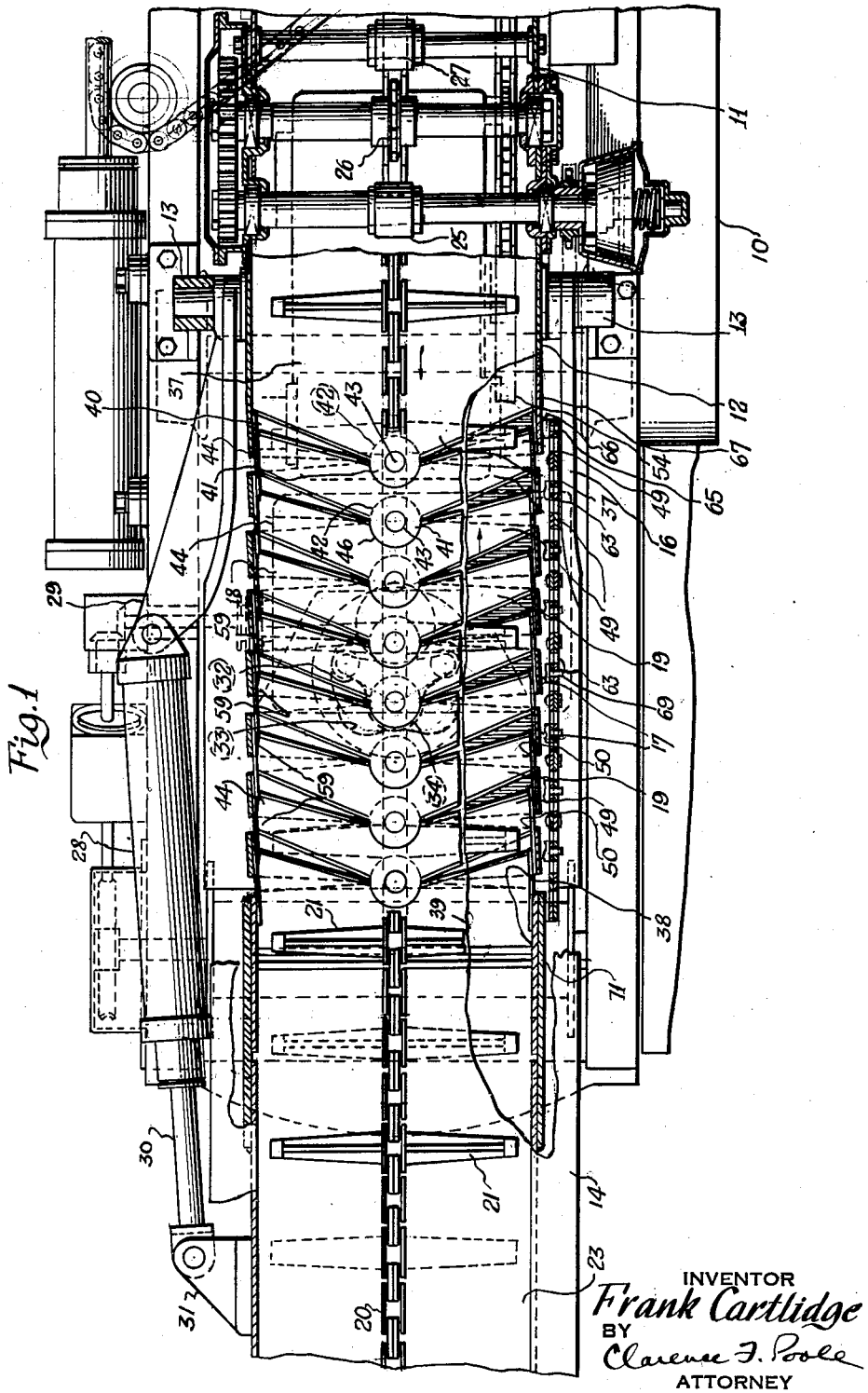
Figure 1 is a plan view of a conveyer constructed in accordance with my invention, with certain parts broken away and certain other parts shown in horizontal section.

In the drawings, the embodiment of my invention illustrated is shown as being mounted on the rear end of a truck 10, which may be a truck of a track mounted loading machine. Said loading machine may be of a type similar to that shown in an application Serial No. 308,565, filed herewith, and is not herein shown or described in detail, since it is no part of my present invention.

The conveyer includes a forward trough section 11 mounted on the frame of the truck 10 and having a rear end 12 which is mounted on trunnion supports 13, 13 for movement about a horizontal transverse axis, to permit vertical adjustment of a rear swinging discharge trough section 14 of said conveyer, so that the rear end of said conveyer may be adjusted for loading into cars or receptacles of varying heights. Said discharge trough section is mounted on an arm 15 which in turn is mounted on a support bracket 16, for lateral swinging movement with respect thereto. Said support bracket projects rearwardly from and forms a part of the frame for said vertically adjustable rear end of said forward trough section.

A plurality of intermediate interconnected trough segments 17, 17 are provided to connect the trough sections 11 and 14 together, to form a continuous trough from one end of the conveyer to the other, when the conveyer is in various positions of articulation. Said trough segments each include an upper trough-like portion 18 and a lower chain guiding portion 19. Said lower portions are provided to guide the return run of an endless conveyer chain 20 on the ends of spaced apart flights 21, 21, projecting laterally from opposite sides thereof at suitable intervals. Said endless chain may be of any laterally flexible type, and has said flights connected thereto in such a manner as to permit said chain and flights to follow the curve of said trough segments when the conveyer is in various positions of articulation.

The endless chain 20 extends around a suitable direction changing device (not shown) at the forward end of the conveyer. From thence it extends along the forward trough section 11 and the vertically adjustable rear end 12 thereof, and along the trough-like portions 18, 18 of the trough segments 17, 17. From said trough segments it extends rearwardly along a bottom plate 23 of said discharge trough section, to and around a direction changing device 24, at the rear end of said discharge trough section. From said direction changing device, said endless chain extends forwardly beneath the bottom plate 23, in and through the lower chain guiding portions 19, 19 of said trough segments, and forwardly therefrom over an idler 25, under a drive sprocket 26 and over an idler 27 to the forward end of the conveyer. Said drive sprocket is driven from a suitable motor (not shown) by a suitable drive connection, which is not herein shown or described in detail, since it is no part of my present invention.

The means for swinging the discharge trough section 14 laterally, comprises a fluid pressure cylinder 28, pivotally mounted at its head end on a bracket 29, projecting outwardly from the support bracket 16. Said cylinder has a suitable piston (not shown) mounted therein. A piston rod 30, extensible from said piston, has pivotal connection with a bracket 31, projecting outwardly from a side wall of said discharge trough section.

The supporting and rocking connection between the arm 15 and support bracket 16, for supporting the trough section 14 for lateral swinging movement, is similar to that disclosed in an application Serial No. 281,127, filed by Chester E. Andershock on June 26, 1939, now Patent No. 2,197,169, so will not herein be described in detail. A cam-shaped rocking member 32 is secured to and depends from the arm 15 a slight distance rearwardly of the forward end of said arm. Said rocking member is adapted to extend within a guide 33 formed in the bracket 16, adjacent the rear end thereof. Said rocking member has a concave portion facing the forward end of the conveyer and a rear bearing portion 34 engaging the rear end of said guide, the center of which rear end extends inwardly beyond the sides thereof. A retaining plate 36 is secured to the underside of said rocking member and engages the bottom of said bracket, to retain said rocking member within said guide and to hold said arm from vertical movement with respect to the support bracket 16.

As the discharge trough section 14 is swung to one side or the other of the longitudinal center line of the conveyer, the ends of the rocking member 32 engage opposite sides of the guide 33, and the rear bearing portion 34 of said rocking member is engaged with the rear portion of said guide, by the piston rod 30. Since the rear portion of said guide is of a forwardly projecting or convex formation, engagement of the rear bearing portion 34 of said rocking member will vary the arc about which said trough section swings, during swinging movement thereof, and compensate for decreases in the length of the path of travel of the chain 20, as said trough section is swung from a central position to one extreme side or the other of the conveyer, and thus maintain an even tension on said chain in all positions of articulation of the conveyer.

Referring now in particular to the articulated connection between the trough sections 11 and 12 forming the novel features of my invention, the trough segments 17, 17 are pivotally connected together by pivotal pins 43, 43. The upper trough-like portion 18 of said forward trough section has pivotal connection with a rear end of a bottom plate 37 of the vertically adjustable portion 12 of the forward trough section 11, and the upper trough-like portion of said rearwardmost trough segment has pivotal connection with the forward end of a bottom plate 39 of a telescopic trough section 38, nested within the forward end of the discharge trough section 14. The trough section 38 is slidably movable with respect to said discharge trough section, to permit extension or retraction of said discharge trough section with respect to said trough segments, during articulation of the conveyer.

The bottoms of the trough-like portions 18, 18 and the chain guiding portions 19, 19 of the trough segments 17, 17 taper in opposite directions from their centers towards their ends, to provide clearance between said trough segments and permit said trough segments to pivot with respect to each other and with respect to the conveyer bottom plates 37 and 39 (see Figures 2 and 6). The gaps between said trough segments are closed by winged gap closing portions 44, 44 and 49, 49, herein shown as being formed integral with said bottoms of said trough-like and chain guiding portions respectively, and projecting forwardly from the ends thereof. The forward and rear edges of said winged portions are beveled, to prevent loose material from fouling said trough segments.

The rear end of the bottom plate 37 of the vertically adjustable portion 12 of the forward trough section 11 is provided with recessed portions 40, 40 in alignment with the bottom of the upper trough-like portions 18 of the trough segments 17, 17. Said recessed portions are adapted to be overlapped by the forwardly projecting wings of the winged gap closing portions 44 of the forwardmost trough segment 17, to close the gaps between said trough segment and bottom plate in all positions of articulation of the conveyer. Said bottom plate is provided with a rearwardly projecting rounded tongue 41 which engages a corresponding rounded socket formed in the forward end of the winged portion 44 of the bottom of said trough-like portion. Said tongue is pivotally connected to a forwardly projecting tongue 42 of the bottom of said upper trough-like portion by means of a pivotal pin or rivet 43. Said gap closing member or winged bottom has a tongue 46, projecting rearwardly therefrom and beyond the rear end of the bottom of the trough-like portion 18. Said tongue fits within the recessed portion of the next adjacent gap closing portion of said trough-like portion, and is pivotally connected to the forwardly projecting tongue 42 of the bottom of the next adjacent trough segment, by means of one of the pivotal pins 43. Said trough segments may all be pivotally connected together in the same manner, and the tongue 46 of the rear winged bottom fits in a corresponding socket formed in the forward end of the bottom plate 39 of the telescopic trough section 38. Said bottom plate is provided with forwardly projecting outer ends which overlap the bottom of the upper trough-like portion 18 of the last trough segment 17, to close the gaps between said bottom plate and trough segment.

Each upper side wall of the trough-like portion of each trough segment 17 has a vertically extending outwardly flared portion 57, conforming to the form of the trough of the forward and discharge trough sections. The gaps between the side walls are closed by means of closure members 59, 59, secured to the inside of each upper side wall and projecting rearwardly therefrom and overlapping the next adjacent side wall. Said closure members may be so formed as to continually engage the next adjacent side wall, or may be yieldable as is shown in the drawings. Other yieldable closure members 60, 60 are secured to the outwardly flared portions 57, 57 and overlap the next adjacent outwardly flared portion, to close the gaps between the outwardly flared portions of said side walls.

The lower guide portions 19, 19 of the trough segments 17, 17 are similar in construction to the upper trough-like portions thereof, and may be pivotally connected together and to the front and rear portions of the conveyer in substantially the same manner as said upper trough-like portions are connected together. The winged gap closing portions 49 of the forward bottom chain guiding portion 19 overlap a lower guide plate 54 of the vertically adjustable portion 12 of the front conveyer 11. A pivotal pin or rivet 55 is provided to pivotally connect said lower guide portion with said guide plate. The extreme rear guide portion is likewise connected to the forward end of a guide plate 56, slidably mounted with respect to the forward end of the discharge conveyer, by means of one of the pivotal pins 55. The spaces between the side walls of said chain guiding portions are closed in all positions of articulation of the conveyer by yieldable closure members 50, 50. Said closure members are secured to each side wall of said chain guiding portion and extend forwardly therefrom to overlap the next adjacent forward side wall (see Figure 1). Thus, a box-like guide is provided for the return run of the conveyer, which is similar in form to the upper articulated trough portion of the conveyer, to positively guide the chain as it moves towards the forward end of the conveyer and to prevent slack or backslapping thereof when the conveyer is in various positions of articulation.

It may thus be seen that an articulated segmental trough has been provided between the trough sections 11 and 14, to close the gaps between said trough sections and permit lateral swinging movement of one with respect to the other. It may also be seen that each trough segment is so formed as to form a channelled guide for the lower run of the conveyer, and that the segmental trough construction is such as to permit the uninterrupted travel of material from one end of the conveyer to the other, when said trough sections are in various positions of adjustment with respect to each other.

Means are provided to equalize movement of the trough segments 17, 17 with respect to each other during swinging movement of the discharge trough section 14, so each trough segment will move the same proportionate distance, and so all of said trough segments will be returned to a normal postion, when the trough section 14 is in longitudinal alignment with the trough section 11. Said means, as herein shown, comprises a plurality of interconnected laterally flexible parallel links 63, 63. Said links are pivotally connected together at their ends and intermediate their ends. The forward and rear end links each have links 64, 64 pivotally connected to the ends thereof and pivotally connected together. A pin 65 is provided to pivotally connect the forward end links 64, 64 together. Said pin projects from a lug 66, extending outwardly from a side wall 67 of the vertically swingable portion of the forward trough section 11. Lugs 68, 68 project outwardly from the outside of one side wall of each trough segment 17 and have pins 69, 69 projecting therefrom, which pivotally connect alternate pairs of links 63, 63 to one of said trough segments, intermediate the ends of said links. The rear end links 64, 64 are pivotally connected to the forward end of a side wall 71 of the discharge trough section 14, by means of a pin 70 projecting outwardly from said side wall. Upon swinging movement of the discharge trough section of the conveyer, said parallel links will yield laterally and extend or retract each intermediate trough segment an equal proportionate distance to keep the gaps between said trough segments closed in all positions of articulation of the conveyer, and form a continuous bottom from one end of the conveyer to the other.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an articulated conveyer, a pair of spaced apart trough sections, one of which is laterally swingable with respect to the other, and means for connecting said trough sections together to form a continuous trough from one end of one trough section to the opposite end of the other including a plurality of intermediate connecting trough segments having parallel spaced upright side walls, said trough segments being pivotally connected together and the extreme end trough segments being pivotally connected to adjacent ends of said trough sections, each of said trough segments having forwardly projecting winged portions overlapping said next adjacent trough segment and closing the gaps formed therebetween, and the side walls of said trough segments having flexible members extending therefrom and engaging the side walls of said next adjacent trough segments.

2. In an articulated conveyer, a pair of spaced apart trough sections, one of which is laterally swingable with respect to the other, an endless chain having flights projecting laterally from opposite sides thereof, said chain turning about a horizontal axis at the rear end of said conveyer and the upper and lower runs thereof traveling in coincidental paths in a vertical plane, and means for connecting said trough sections together to form a continuous trough from one end of one trough section to the opposite end of the other and to guide the upper and lower runs of said chain upon swinging movement of said trough sections with respect to each other including a plurality of interconnected trough segments, each of said segments including an upper trough-like portion for guiding the upper run of the chain on the ends of its projecting flights and a lower guiding portion for guiding the lower run of the chain on the ends of its projecting flights.

3. In an articulated conveyer, a pair of spaced apart trough sections, one of which is laterally swingable with respect to the other, an endless chain having flights projecting laterally from opposite sides thereof, said chain turning about a horizontal axis at the rear end of said conveyer and the upper and lower runs thereof traveling in coincidental paths in a vertical plane, and means for connecting said trough sections together to form a continuous trough from one end of one trough section to the opposite end of the other and to guide the upper and lower runs of said chain upon swinging movement of said trough sections with respect to each other including a plurality of trough segments pivotally connected together, each of said trough segments including an upper trough-like portion and a lower guiding portion for the lower run of the chain, and the bottoms of said upper and lower portions having winged portions projecting therefrom and overlapping the bottoms of said next adjacent trough segment, to bridge the gaps between said trough segments.

4. In an articulated conveyer, a pair of spaced apart trough sections, one of which is laterally swingable with respect to the other, an endless chain having flights projecting laterally from opposite sides thereof, said chain turning about a horizontal axis at the rear end of said conveyer and the upper and lower runs thereof traveling in coincidental paths in a vertical plane, and means to connect said trough sections together to form a continuous trough from one end of one trough section to the opposite end of the other and guide the upper and lower runs of said chain on the ends of said flights upon swinging movement of said trough sections with respect to each other including a plurality of trough segments pivotally connected together, each of said trough segments including an upper trough-like portion having a bottom and upright side walls, and a lower guiding portion, for the lower run of the chain, said lower guiding portion having a bottom spaced beneath the bottom of said upper trough-like portion and having upright sides forming a downward continuation of the sides of said upper trough-like portion, said bottoms of said upper and lower portions of said trough segments having winged projections overlapping the bottoms of said next adjacent trough segments, to close the gaps therebetween, and said side walls of said trough-like and chain guiding portions having flexible portions overlapping said next adjacent rearward side wall.

5. In an articulated conveyer, a pair of spaced apart trough sections, one of which is laterally swingable with respect to the other, a plurality of pivotally connected intermediate trough segments for connecting said trough sections together in all positions of articulation thereof, a center strand endless chain having flights projecting laterally therefrom, guided for movement along said trough sections, the ends of said flights engaging the sides of said trough segments and serving to guide said chain along said trough sections, when the conveyer is in various positions of articulation, means for positively extending or retracting said swinging trough section during swinging movement thereof, to take care of variations in the length of the path of travel of said chain, and to maintain a uniform tension on said chain in all positions of articulation of the conveyer, and a longitudinally slidable connection between said swingable trough and intermediate trough segments, to permit extension or retraction thereof with respect to said trough segments.

6. In an articulated conveyer, a pair of spaced apart trough sections, one of which is laterally swingable with respect to the other, a plurality of pivotally connected intermediate trough segments for connecting said trough sections together in all positions of articulation thereof, a center strand endless chain having flights projecting laterally therefrom guided for movement along said trough sections, the ends of said flights engaging the sides of said trough segments and serving to guide said chain along said trough sections when the conveyer is in various positions of articulation, means for positively extending or retracting said swinging trough section during swinging movement thereof to take care of variations in the length of the path of travel of said chain and to maintain a uniform tension on said chain in all positions of articulation of the conveyer, and a longitudinally slidable connection between said swingable trough and intermediate trough segments to permit extension or retraction thereof with respect to said trough segments including a trough section nested within said swingable trough section and slidably movable with respect thereto, and a pivotal connection between said slidable trough section and one of said end intermediate trough segments.

FRANK CARTLIDGE.